(12) United States Patent
Yin et al.

(10) Patent No.: US 12,332,162 B2
(45) Date of Patent: Jun. 17, 2025

(54) PHOTOACOUSTIC SPECTRUM PHASE LOCKING METHOD, APPARATUS, AND SYSTEM

(71) Applicant: ZHEJIANG LAB, Hangzhou (CN)

(72) Inventors: Yonggang Yin, Hangzhou (CN); Danyang Ren, Hangzhou (CN); Yuqi Wang, Hangzhou (CN); Junhui Shi, Hangzhou (CN); Yongyong Jin, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 134 days.

(21) Appl. No.: 18/225,694

(22) Filed: Jul. 25, 2023

(65) Prior Publication Data

US 2024/0167940 A1     May 23, 2024

Related U.S. Application Data

(63) Continuation of application No. PCT/CN2023/090960, filed on Apr. 26, 2023.

(30) Foreign Application Priority Data

Nov. 17, 2022 (CN) .................. 202211463444.X

(51) Int. Cl.
*G01N 21/17* (2006.01)
*G01N 29/24* (2006.01)

(52) U.S. Cl.
CPC ..... *G01N 21/1702* (2013.01); *G01N 29/2418* (2013.01); *G01N 2021/1704* (2013.01); *G01N 2201/06113* (2013.01)

(58) Field of Classification Search
CPC .......... G01N 21/1702; G01N 21/1714; G01N 29/2418; G01N 29/346; G01N 29/40;
(Continued)

(56) References Cited

U.S. PATENT DOCUMENTS

| 6,608,683 B1 | 8/2003 | Pilgrim et al. |
| 6,618,148 B1 | 9/2003 | Pilgrim et al. |

(Continued)

FOREIGN PATENT DOCUMENTS

| CN | 1945252 A | 4/2007 |
| CN | 104316466 A | 1/2015 |
| CN | 115615928 A | 1/2023 |

OTHER PUBLICATIONS

International Search Report of PCT/CN2023/090960.
(Continued)

*Primary Examiner* — Suman K Nath

(57) ABSTRACT

A photoacoustic spectrum phase locking method, apparatus, and system are provided. The photoacoustic spectrum phase locking method includes: acquiring a mapping relationship between an output amplitude and an output phase of a photoacoustic spectrum system; determining a reference phase of the photoacoustic spectrum system according to the mapping relationship; and adjusting scanning parameters of a laser in the photoacoustic spectrum system according to the reference phase, so that an output phase in a current preset cycle of the photoacoustic spectrum system is equal to the reference phase.

12 Claims, 6 Drawing Sheets

(58) Field of Classification Search
CPC .... G01N 29/48; G01N 29/50; G01N 29/4409; G01N 2021/1704; G01N 2201/06113
See application file for complete search history.

(56) References Cited

U.S. PATENT DOCUMENTS

| | | | |
|---|---|---|---|
| 7,525,661 B2* | 4/2009 | Mandelis | G01N 21/1702 356/237.1 |
| 2013/0102865 A1* | 4/2013 | Mandelis | G01N 21/1702 600/328 |

OTHER PUBLICATIONS

Ke Chen, et al. "Lock-in white-light-interferometry-based all-optical photoacoustic spectrometer", Optics Letters, 2018, 43(20): (Oct. 10, 2018), p. 5038 to p. 5041. ISSN: 0146-9592.

* cited by examiner

PHOTOACOUSTIC SPECTRUM PHASE LOCKING METHOD, APPARATUS, AND SYSTEM

CROSS REFERENCE TO RELATED APPLICATIONS

This application is a continuation of international patent application No. PCT/CN2023/090960, filed on Apr. 26, 2023, which itself claims priority to Chinese patent application No. 202211463444.X, and entitled "PHOTOACOUSTIC SPECTRUM PHASE LOCKING METHOD, APPARATUS, AND SYSTEM", filed on Nov. 17, 2022. The content of the above identified applications is hereby incorporated herein in their entireties by reference.

TECHNICAL FIELD

The present disclosure relates to the field of photoacoustic spectrums, and in particular, to a photoacoustic spectrum phase locking method, apparatus, and system.

BACKGROUND

Trace and tiny gas detection technologies based on photoacoustic spectrums have been widely used in fields such as environmental protection, industrial detection, and medical monitoring in recent years. A photoacoustic spectrum technology is a laser absorption spectrum technology based on a photoacoustic effect. After gas molecules absorb modulated laser energy or pulsed laser energy, periodic thermal expansion may be generated, and then an acoustic wave is excited. A frequency of the acoustic wave depends on a laser modulation frequency. Strength of the sound wave reflects information such as concentration of a gas under test. Compared with a conventional direct absorption spectrum technology, the photoacoustic spectrum technology converts light energy into acoustic wave energy, which is completely unaffected by background light. Through a resonance design of an acoustic resonant cavity or a mechanical resonator, a detection signal-to-noise ratio of an acoustic wave signal can be further improved.

However, as a Q value of a resonant system continues to increase, a photoacoustic spectrum gas detection system is also increasingly affected by environmental factors, and a natural frequency of the resonant system may change with a temperature, air pressure, and the like. In a current photoacoustic spectrum gas detection technology, the laser modulation frequency is generally fixed, which may cause the system to be unable to maintain a resonant state at all times, and an output amplitude may drift with environmental influences. Moreover, if the Q value of the system is higher, a drift coefficient is greater. A conventional photoacoustic spectrum technology cannot track the resonant frequency of the system in real time, and can only calibrate the frequency of the system through regular frequency sweeping.

With respect to the problem in the related art that the resonant frequency of the photoacoustic spectrum system is greatly disturbed by environmental factors, no effective solution has been proposed yet.

SUMMARY

According to various embodiments of the present disclosure, a photoacoustic spectrum phase locking method, apparatus, and system are provided.

In a first aspect, a photoacoustic spectrum phase locking method is provided, applied to a photoacoustic spectrum system. The method includes: acquiring a mapping relationship between an output amplitude and an output phase of the photoacoustic spectrum system; determining a reference phase of the photoacoustic spectrum system according to the mapping relationship; and adjusting scanning parameters of a laser in the photoacoustic spectrum system according to the reference phase, so that an output phase in a current preset cycle of the photoacoustic spectrum system is equal to the reference phase.

In an embodiment, the acquiring the mapping relationship between the output amplitude and the output phase of the photoacoustic spectrum system includes: acquiring a frequency sweep signal, the frequency sweep signal including a plurality of modulation signals at different frequencies; and controlling the laser to scan a detected target according to the frequency sweep signal, to obtain the output amplitude and the output phase of the photoacoustic spectrum system.

In an embodiment, the acquiring the frequency sweep signal includes: acquiring a plurality of reference signals, a frequency range corresponding to the plurality of reference signals including a resonant frequency of the photoacoustic spectrum system; and performing frequency modulation on the plurality of reference signals to obtain the frequency sweep signal.

In an embodiment, the determining the reference phase of the photoacoustic spectrum system according to the mapping relationship includes: determining a resonance peak according to the output amplitude; and taking the output phase corresponding to the resonant peak as the reference phase according to the mapping relationship.

In an embodiment, the adjusting the scanning parameters of the laser in the photoacoustic spectrum system according to the reference phase includes: acquiring the output phase corresponding to a laser modulation signal in a previous preset cycle; adjusting the laser modulation signal in the previous preset cycle according to the output phase in the previous preset cycle, the reference phase, and a discrete proportional-integral-derivative (PID) control algorithm, to obtain a target modulation signal in the current preset cycle; and adjusting the scanning parameters of the laser in the photoacoustic spectrum system according to the target modulation signal.

In a second aspect, a photoacoustic spectrum phase locking apparatus is provided, including:
  an acquisition module configured to acquire a mapping relationship between an output amplitude and an output phase of a photoacoustic spectrum system;
  a processing module configured to determine a reference phase of the photoacoustic spectrum system according to the mapping relationship; and
  a phase locking module configured to adjust scanning parameters of a laser in the photoacoustic spectrum system according to the reference phase, so that an output phase in a current preset cycle of the photoacoustic spectrum system is equal to the reference phase.

In a third aspect, a photoacoustic spectrum system is provided, including: a first control device, a detection device, and a second control device; wherein the first control device is connected to the detection device and the second control device; the first control device is configured to configure scanning parameters of the detection device; the detection device is configured to emit laser light on a detected target according to the scanning parameters to generate a signal under test; and the second control device is configured to perform the photoacoustic spectrum phase locking method in the above first aspect.

In an embodiment, the detection device includes a laser, a photoacoustic cell, and an acoustic sensor, the laser being connected to the first control device and the photoacoustic cell, the photoacoustic cell being connected to the acoustic sensor, and the acoustic sensor being connected to the second control device; the laser being configured to emit laser light to the photoacoustic cell according to the scanning parameters; the photoacoustic cell being configured to accommodate a gas under test, so that the gas under test generates an acoustic wave signal under laser irradiation; and the acoustic sensor being configured to receive and enhance the acoustic wave signal, generate an electrical signal or a digital signal from the enhanced acoustic wave signal, and send the electrical signal or the digital signal to the second control device.

In an embodiment, the photoacoustic cell and/or the acoustic sensor are/is in a resonant state.

In an embodiment, the first control device includes a signal generator and a laser controller, and the second control device includes a lock-in amplifier and a closed-loop controller. The signal generator is connected to the closed-loop controller and the laser controller respectively. The laser controller is connected to the laser. The lock-in amplifier is connected to the acoustic sensor and the closed-loop controller respectively. The signal generator is configured to generate a modulation signal and send the modulation signal to the laser controller. The laser controller is configured to configure scanning parameters for the laser according to the modulation signal. The lock-in amplifier is configured to generate an output amplitude and an output phase according to a reference signal and the signal under test. And the closed-loop controller is configured to determine a reference phase according to the output amplitude and the output phase, generate a main control signal according to the reference phase, and send the main control signal to the signal generator, so that the signal generator adjusts the scanning parameters of the laser in the photoacoustic spectrum system according to the main control signal, enabling an output phase in a current preset cycle of the photoacoustic spectrum system to be equal to the reference phase.

Details of one or more embodiments of the present disclosure are set forth in the following accompanying drawings and descriptions, so as to make other features, objectives, and advantages of the present disclosure more comprehensible.

BRIEF DESCRIPTION OF THE DRAWINGS

In order to more clearly illustrate the technical solutions in embodiments of the present disclosure or the conventional art, the accompanying drawings to be used in the description of the embodiments or the conventional art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION OF THE EMBODIMENTS

The technical solutions in the embodiments of the present disclosure will be described clearly and completely below with reference to the accompanying drawings in the embodiments of the present disclosure. Apparently, the described embodiments are merely some of rather than all of the embodiments of the present disclosure. All other embodiments acquired by those skilled in the art without creative efforts based on the embodiments of the present disclosure shall fall within the protection scope of the present disclosure.

Unless defined otherwise, technical and scientific terms as referred to in the present disclosure have the same meanings as would generally understood by those skilled in the technical field of the present disclosure. Similar words such as "a", "an", "one", and "the" as referred to in the present disclosure do not indicate a limitation on a quantity, and may indicate singular or plural forms. Terms such as "comprise", "include", "have", and other variants thereof as referred to in the present disclosure are intended to cover a non-exclusive inclusion, for example, processes, methods, systems, products or devices including a series of steps or modules (units) are not limited to these steps or modules (units) listed explicitly, but rather include other steps or modules (units) not listed, or other steps or modules (units) inherent to these processes, methods, systems, products or devices. Similar words such as "connect", "join", and "couple" as referred to in the present disclosure are not limited to physical or mechanical connections, but may include electrical connections, whether direct or indirect. "A plurality of" as referred to in the present disclosure means two or more. "And/or" indicates an association relationship describing associated objects, indicating that three relationships may exist. For example, "A and/or B" indicates that there are three cases of A alone, A and B together, and B alone. The character "/" generally means that the associated objects are in an "or" relationship. The terms "first", "second", "third", and the like as referred to in the present disclosure are only intended to distinguish similar objects, and do not represent a specific ranking of objects.

Figure 1:
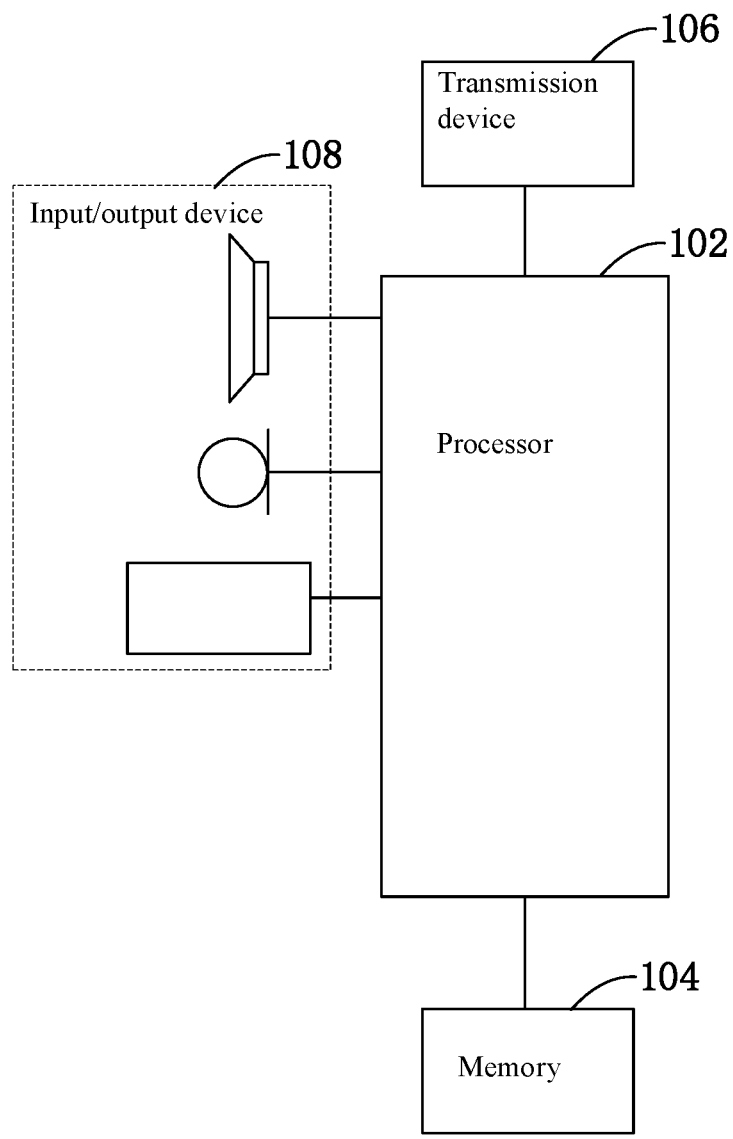
FIG. 1 is a block diagram of a hardware structure of a terminal for a photoacoustic spectrum phase locking method according to this embodiment.

Method embodiments provided in this embodiment may be performed in a terminal, a computer, or similar arithmetic apparatuses. For example, the method is performed in a terminal. FIG. 1 is a block diagram of a hardware structure of a terminal for a photoacoustic spectrum phase locking method according to this embodiment. As shown in FIG. 1, the terminal may include one or more (only one is shown in FIG. 1) processors 102 and a memory 104 configured to store data. The processor 102 may include, but is not limited to, a processing apparatus such as a micro-processing unit (MCU) or a field programmable gate array (FPGA). The above terminal may further include a transmission device 106 for a communication function and an input/output device 108. Those of ordinary skill in the art may understand that the structure shown in FIG. 1 is merely illustrative, and does not form any limitation on the structure of the above terminal. For example, the terminal may further include more or fewer components than those shown in FIG. 1, or have a different configuration than that shown in FIG. 1.

The memory 104 may be configured to store a computer program, for example, a software program and a module of application software, such as a computer program corresponding to the photoacoustic spectrum phase locking method in this embodiment. The processor 102 executes the computer program stored in the memory 104 to perform various functions and data processing, that is, implement the above method. The memory 104 may include a high-speed random access memory and may also include a non-volatile memory such as one or more magnetic storage apparatuses, a flash memory, or other non-volatile solid-state memories. In some examples, the memory 104 may further include a memory remotely arranged relative to the processor 102. The remote memories may be connected to the terminal over a network. Examples of the above network include, but are not limited to, the Internet, an intranet, a local area network, a mobile communication network, and combinations thereof.

The transmission device 106 is configured to receive or transmit data via a network. The above network may include a wireless network provided by a communication provider of the terminal. In an example, the transmission device 106 includes a Network Interface Controller (NIC) that may be connected to another network device through a base station to communicate with the Internet. In an example, the transmission device 106 may be a Radio Frequency (RF) module configured to communicate with the Internet wirelessly.

A beam of monochromatic light with adjustable intensity or an adjustable wavelength is irradiated on a sample sealed in a photoacoustic cell. The sample absorbs light energy and de-excites by releasing heat energy. The released heat energy causes periodic heating of the sample and a surrounding medium according to a modulation frequency of the light, resulting in periodic pressure fluctuations in the medium. Such pressure fluctuations can be detected by a sensitive microphone or a piezoelectric ceramic microphone, and a photoacoustic signal is obtained through amplification, which is a photoacoustic effect. If a wavelength of an incident monochromatic light is variable, a photoacoustic signal spectrum that varies with the wavelength can be measured, which is a photoacoustic spectrum.

A photoacoustic spectrum technology is a spectrum technology based on the photoacoustic effect. As an important branch of spectroscopy, the photoacoustic spectrum technology is different from conventional spectroscopy in that the technology does not detect a light signal fed back after interaction between light and matter, but detects an acoustic signal fed back after the interaction between light and matter, thereby overcoming many difficulties in sample analysis of the conventional spectroscopy. In the conventional spectroscopy, light scattering and reflection are the biggest disturbances, because an amount of the light energy absorbed by the sample is determined by measuring intensity of transmitted light based on a difference obtained by subtracting the intensity of the transmitted light from intensity of incident light. However, a process of the interaction between light and matter is bound to be accompanied by certain reflection, scattering, and other light losses, which may lead to a decrease in the intensity of the incident light. In addition, the conventional spectroscopy detects a transmitted light signal after the interaction between light and matter, so the sample must have certain light transmittance. In contrast, the photoacoustic spectrum technology detects the acoustic wave signal generated by the absorption of light energy by the matter. The strength of the acoustic wave signal directly reflects magnitude of the light energy absorbed by the matter. Therefore, signal interference caused by light reflection and scattering in the sample is prevented. At the same time, for weakly absorbing samples, irradiation power of the incident light can also be appropriately increased to improve a signal-to-noise ratio. Therefore, it is widely used in a variety of sample detection, such as transparent or opaque solid, liquid, gas, powder, colloidal, crystal, non-crystal, and the like, which solves the problems of the conventional spectroscopy in the detection of samples with weak absorption, strong scattering, and opacity in essence.

A photoacoustic spectrum system relies on the design of a resonant system. In a case where the resonant system is under a periodic external force, when a frequency of the external force is the same as or very close to a natural oscillation frequency of the system, a phenomenon that the amplitude increases sharply is called resonance, and a frequency at which resonance occurs is called a resonant frequency. A Q value is generally used to describe resonance capability of the resonant system. As the Q value of the resonant system continues to increase, a photoacoustic spectrum gas detection system is also increasingly affected by environmental factors, and a natural frequency of the resonant system may change with a temperature, air pressure, and the like. In a current photoacoustic spectrum gas detection technology, the laser modulation frequency is generally fixed, which may cause the system to be unable to maintain a resonant state at all times, and a output amplitude may drift with environmental influences. Moreover, if the Q value of the system is higher, a drift coefficient is greater. A conventional photoacoustic spectrum technology cannot track the resonant frequency of the system in real time, and can only calibrate the frequency of the system through regular frequency sweeping. Therefore, it is urgent to improve anti-interference performance of the photoacoustic spectrum system.

Figure 2:
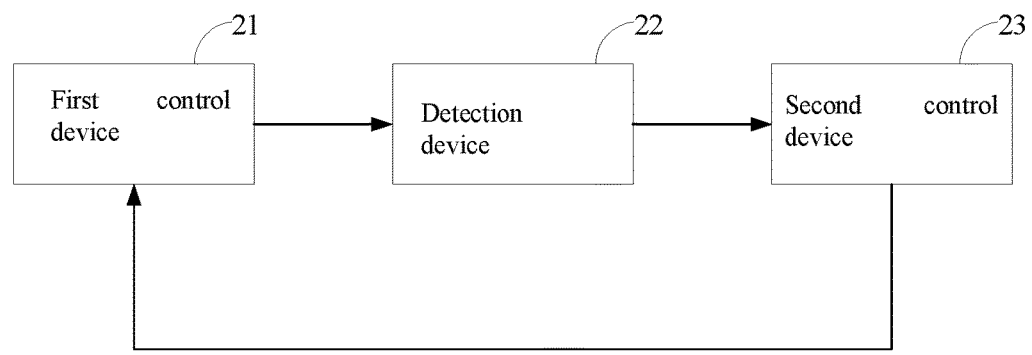
FIG. 2 is a schematic structural diagram of a photoacoustic spectrum system according to embodiments of the present disclosure.

This embodiment provides a photoacoustic spectrum system. FIG. 2 is a schematic structural diagram of a photoacoustic spectrum system according to embodiments of the present disclosure. As shown in FIG. 2, the system includes a first control device 21, a detection device 22, and a second control device 23. The first control device 21 is connected to the detection device 22 and the second control device 23. The first control device 21 is configured to configure scanning parameters of the detection device 22. The detection device 22 is configured to emit laser light on a detected target according to the scanning parameters to generate a signal under test. The second control device 23 is configured to acquire a mapping relationship between an output amplitude and an output phase of the photoacoustic spectrum system, determine a reference phase of the photoacoustic spectrum system according to the mapping relationship, and adjust scanning parameters of a laser in the photoacoustic spectrum system according to the reference phase, so that an output phase in a current preset cycle of the photoacoustic spectrum system is equal to the reference phase.

Specifically, the detection device is a device configured for photoacoustic spectrum detection, including a laser, a photoacoustic cell, an acoustic sensor, and the like. The detected target includes, but is not limited to, transparent or opaque solid, liquid, gas, powder, colloid, crystal, non-crystal, and the like. The first control device is configured to perform signal modulation according to a control instruction issued by the user, and configure a frequency, intensity, a waveform, scanning time, and the like of laser light by adjusting the scanning parameters of the laser. The second control device is configured to facilitate a user to issue the control instruction and acquire and analyze a detection signal generated by the detection device. Through the photoacoustic spectrum system in this embodiment, the second control device may select the reference phase according to the mapping relationship between the output amplitude and the output phase of the photoacoustic spectrum system, and issue a main control signal to the first control device based on the phase, enabling the output phase of the system to be equal to the reference phase by adjusting the scanning parameters of the laser in the photoacoustic spectrum system. The reference phase is a position corresponding to a peak of the output amplitude, and the reference phase may not drift due to a change in the environmental factors such as a temperature. Therefore, a phase of the control signal can be locked to the reference phase to ensure that an output signal amplitude of the system is at a peak, thereby ensuring resonance performance of the photoacoustic spectrum system and improving anti-interference capability of the system.

Compared with the photoacoustic spectrum system in the related art that uses a fixed frequency to operate the laser, the photoacoustic spectrum system in this embodiment adopts a phase closed-loop locking control manner. Through the configuration of the reference phase, the output phase of the system is always locked to the reference phase. The reference phase is located at a position corresponding to a resonance peak of the output amplitude in the resonant state of the photoacoustic spectrum system, and the mapping relationship does not change with a change in an operating temperature of the system. Therefore, through the phase closed-loop locking method, the output phase of the system is locked to the reference phase, so that the photoacoustic spectrum system is always kept in the resonant state, and the resonant frequency of the system can be locked in real time without regular frequency sweeping and calibration, which solves the problem that the system cannot cope with the change of the resonant frequency with the environmental factors, reduces a drift coefficient of the system, expands a range of the operating temperature of the system, and improves stability of the system.

Figure 3:
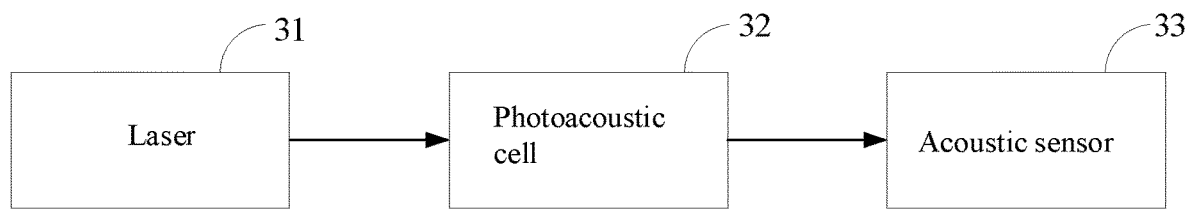
FIG. 3 is a schematic diagram of a detection device of the photoacoustic spectrum system according to embodiments of the present disclosure.

FIG. 3 is a schematic diagram of a detection device of the photoacoustic spectrum system according to embodiments of the present disclosure. As shown in FIG. 3, the detection device includes a laser 31, a photoacoustic cell 32, and an acoustic sensor 33. The laser 31 is connected to the first control device and the photoacoustic cell 32, the photoacoustic cell 32 is connected to the acoustic sensor 33, and the acoustic sensor 33 is connected to the second control device. The laser 31 is configured to emit laser light to the photoacoustic cell 32 according to the scanning parameters. The photoacoustic cell 32 is configured to accommodate a gas under test, so that the gas under test generates an acoustic wave signal under laser irradiation. The acoustic sensor 33 is configured to receive and enhance the acoustic wave signal, generate an electrical signal or a digital signal from the enhanced acoustic wave signal, and send the electrical signal or the digital signal to the second control device.

Specifically, the laser is configured to emit laser light. In the photoacoustic spectrum system, a Quantum Cascade Laser (QCL), a Distributed Feed Back (QFB) laser, an Optical Parametric Oscillator (OPO) laser, an Interband Cascade Laser (ICL), or the like with an adjustable wavelength may generally be selected as the laser. The laser light emitted by the laser may be continuous light or pulsed light. The photoacoustic cell is configured to accommodate the gas under test. When the laser light emitted by the laser passes through the photoacoustic cell, gas molecules may undergo periodic thermal expansion after absorbing modulated laser energy, and then excite an acoustic wave, which is a photoacoustic effect. The acoustic wave signal is received by the acoustic sensor and converted into an electrical signal or a digital signal.

In an embodiment, the photoacoustic cell and/or the acoustic sensor are/is in a resonant state.

Specifically, if the photoacoustic cell operates in the resonant state, generally, a slender cylindrical photoacoustic cell is selected to form an acoustic resonant cavity, and the acoustic wave signal is enhanced by using a standing wave. If the acoustic sensor operates in the resonant state, generally, a mechanical cantilever beam or a quartz tuning fork is selected as the acoustic sensor, and the acoustic wave signal is enhanced by mechanical resonance, but a microphone with a flat frequency response cannot be selected as the acoustic sensor. In the resonant state, the output amplitude of the system may reach tens or even hundreds of times of a non-resonant state. Therefore, in the photoacoustic spectrum system in this embodiment, there is a need to ensure that at least one of the photoacoustic cell and the acoustic sensor is in the resonant state.

Figure 4:
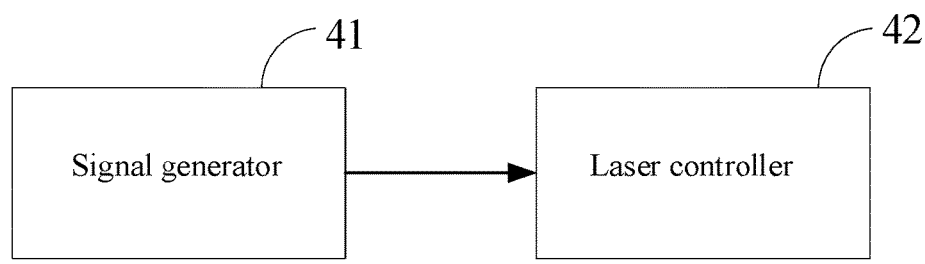
FIG. 4 is a schematic diagram of a first control device of the photoacoustic spectrum system according to embodiments of the present disclosure.
Figure 5:
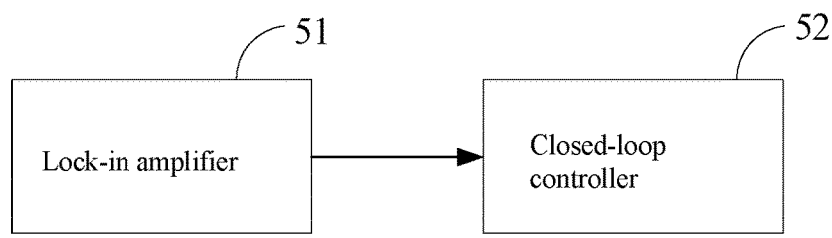
FIG. 5 is a schematic diagram of a second control device of the photoacoustic spectrum system according to embodiments of the present disclosure.

FIG. 4 is a schematic diagram of a first control device of the photoacoustic spectrum system according to embodiments of the present disclosure, and FIG. 5 is a schematic diagram of a second control device of the photoacoustic spectrum system according to embodiments of the present disclosure. As shown in FIG. 4 and FIG. 5, the first control device includes a signal generator 41 and a laser controller 42, and the second control device includes a lock-in amplifier 51 and a closed-loop controller 52. The signal generator 41 is connected to the closed-loop controller 52 and the laser controller 42, and the laser controller 42 is connected to the laser. The lock-in amplifier 51 is connected to the acoustic sensor and the closed-loop controller 52. The signal generator 41 is configured to generate a modulation signal and send the modulation signal to the laser controller 42. The laser controller 42 is configured to configure scanning parameters for the laser according to the modulation signal. The lock-in amplifier 51 is configured to generate an output amplitude and an output phase according to a reference signal and the signal under test. The output phase is a phase difference between the reference signal and the signal under test. The closed-loop controller 52 is configured to determine a reference phase according to the output amplitude and the output phase, generate a main control signal according to the reference phase, and send the main control signal to the signal generator 41, so that the signal generator 41 adjusts the scanning parameters of the laser in the photoacoustic spectrum system according to the main control signal, enabling an output phase in a current preset cycle of the photoacoustic spectrum system to be equal to the reference phase.

Specifically, the signal generator is configured to generate the modulation signal, and modulate a current of the laser through the modulation signal, so as to modulate a wavelength of the laser 31. In the photoacoustic spectrum detection system, the modulation signal is generally a low-frequency sawtooth wave superimposed on a high-frequency sine wave. The low-frequency sawtooth wave is used to determine a wavelength scanning range, with a frequency generally ranging from 0.1 Hz to 10 Hz. The high-frequency sine wave is used to modulate the acoustic wave signal, and the modulation method is mainly divided into first harmonic modulation and second harmonic modulation. In the first harmonic modulation, a frequency of the sine wave is equal to a frequency f of an acoustic signal under test, and in the second harmonic modulation, the frequency of the sine wave is equal to half of the frequency of the acoustic signal under test, i.e., f/2. The second harmonic modulation is a mainstream wavelength modulation method in a current photoacoustic spectrum system. At the same time, the frequency of the acoustic wave signal is modulated to the resonant frequency of the resonant system. The resonant frequency is generally at a kHz level, and an acoustic wave can be amplified and enhanced by using resonance characteristics. The signal generator may be controlled by the second control device. The user can issue a control instruction through the second control device to cause the signal generator to change parameters such as a frequency, an amplitude, and the like of an output waveform thereof.

The laser controller may control a current and a temperature of the laser, thereby controlling an emission wavelength of the laser. The control over the temperature is intended to maintain characteristics of the temperature of the laser, so that the wavelength thereof is fixed near an absorption peak of the gas under test. The control over the current is intended to scan the wavelength of the laser within a certain range to obtain a photoacoustic spectrum of the gas under test.

A function of the lock-in amplifier is to extract a signal amplitude in a specific frequency range to suppress noise in other frequency bands and increase the signal-to-noise ratio of the signal. The lock-in amplifier has two input ends: one is a signal under test, i.e., an output signal of the acoustic sensor; the other is a reference signal, i.e., a sine wave signal provided by an internal oscillator of a computer. A frequency of the reference signal is equal to that of the signal under test. The lock-in amplifier has two output ends. One is an amplitude R, and the other is a phase θ. The amplitude is signal strength of the signal under test near the frequency f, which is final output of the system and reflects properties of the sample. For example, in gas detection, the amplitude reflects concentration of the gas. The phase is a phase difference between the signal under test and the reference signal. A phase in an $i^{th}$ measurement cycle is denoted as $\theta_i$.

In an embodiment, the lock-in amplifier calculates an amplitude and a phase of the signal under test by bi-phase demodulation. Specifically, the computer uses the internal oscillator to generate two sinusoidal signals, namely a signal A and a signal B. A phase difference between the signal A and the signal B is 90°, amplitudes of the signal A and the signal B are 1, and their frequencies are equal to the frequency f of the signal under test. At time t, the signal under test and the signals A and B may be expressed as:

the signal under test: $R \times \sin(2\pi f t + \theta)$;

the signal A: $\sin(2\pi f t)$;

the signal B: $\sin(2\pi f t + 90°)$.

The signal under test is multiplied by the signal A and the signal B respectively. That is, a frequency mixing operation is performed. Then, a high-frequency component is removed by low-pass filtering, to obtain projections of the signal under test on in-phase and orthogonal components respectively, denotes as X and Y. The formulas are:

$$X = \frac{R}{2} \times \cos(\theta) \text{ and } Y = \frac{R}{2} \times \cos(\theta - 90°).$$

Finally, the amplitude and the phase of the signal under test can be calculated. The amplitude is $R = 2\sqrt{X^2 + Y^2}$, and the phase is $\theta = \tan^{-1}(Y/X)$.

A function of the closed-loop controller is to adjust a sine wave frequency of the signal generator to stabilize the phase of the system at the reference phase. The reference phase is a phase difference between the signal under test and the reference signal preset by the system, denoted as $\theta_0$. In a specific embodiment, the closed-loop controller may be a PID controller, i.e., a proportional-integral-derivative controller, and may perform closed-loop control over $\theta_i$ by using a discrete PID control algorithm, to keep $\theta_i$-$\theta_0$ 0. Output of the closed-loop controller is a sine wave frequency, i.e., a laser modulation frequency, and the frequency is f/2 in the second harmonic modulation. That is, a sine wave component outputted by the signal generator may be expressed as $\sin(\pi f t)$. The signal A is the reference signal of the lock-in amplifier, and a frequency thereof is also controlled by the closed-loop controller, which is twice the laser modulation frequency and equal to the frequency of the signal under test.

Figure 6:
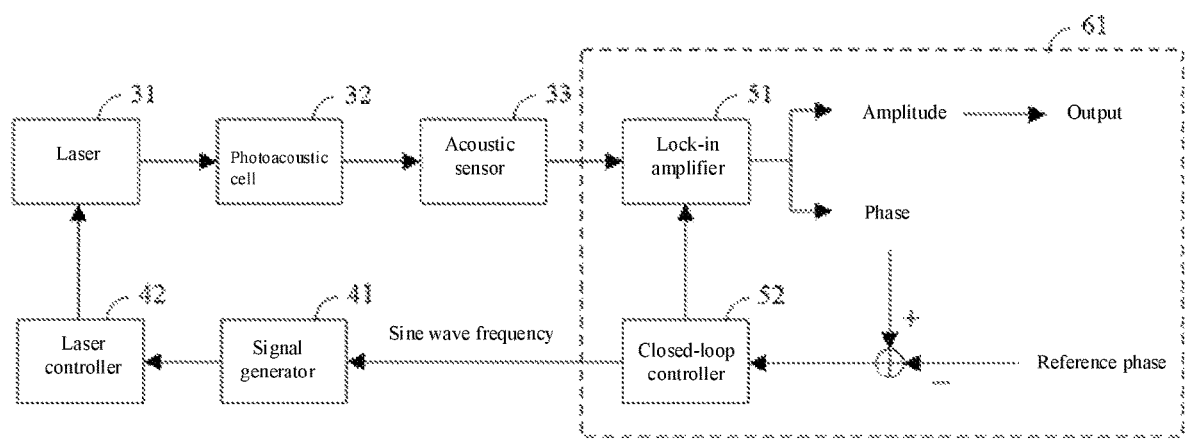
FIG. 6 is a schematic structural diagram of a photoacoustic spectrum system according to optional embodiments of the present disclosure.

This embodiment provides a specific photoacoustic spectrum system. FIG. 6 is a schematic structural diagram of a photoacoustic spectrum system according to optional embodiments of the present disclosure, which, as shown in FIG. 6, includes: a laser 31, a photoacoustic cell 32, an acoustic sensor 33, a computer, a signal generator 41, and a laser controller 42. The lock-in amplifier 51 and the closed-loop controller 52 are located in a computer device 61. An oscillator inside the computer device 61 provides a sine wave signal and sends the sine wave signal to the signal generator 41. The signal generator 41 receives a main control instruction from the computer, and generates a modulation signal to modulate a current of the laser controller 42, thereby modulating the wavelength of the laser 31. The laser 31 emits laser light with a preset wavelength to irradiate the sample in the photoacoustic cell 32. When the photoacoustic spectrum system is configured to detect a gas, the photoacoustic cell 32 accommodates the gas under test. When the laser light emitted by the laser 31 passes through the photoacoustic cell 32, an acoustic wave signal may be generated. The acoustic wave signal is received by the acoustic sensor 33 and converted into an electrical signal or a digital signal. A function of the lock-in amplifier 51 is to extract a signal amplitude in a specific frequency range to suppress noise in other frequency bands and increase the signal-to-noise ratio of the signal. The lock-in amplifier 51 has two input ends: one is a signal under test, i.e., an output signal of the acoustic sensor 33; the other is a reference signal, i.e., a sine wave signal provided by an internal oscillator of a computer, whose frequency is equal to that of the signal under test. The lock-in amplifier 51 has two output ends: one is an amplitude, and the other is a phase. A function of the closed-loop controller 52 is to adjust a sine wave frequency of the signal generator 41 to stabilize the phase of the system at the reference phase. And the reference phase is a phase difference between the signal under test and the reference signal preset by the system.

When the photoacoustic spectrum gas system is in the resonant state, there is a fixed difference in phase between the output of the system and the laser modulation signal. The difference is mainly determined by processes of photoacoustic conversion, acoustic resonance or mechanical resonance, and acoustic-electric conversion. There is a phase difference in each process. In the resonant state, the phase difference between the output of the system and the modulation signal is measured as the reference phase, and then the laser modulation frequency is changed through a closed-loop to make the phase difference of the system always equal to the reference phase. Then, even if a change in the environmental factors such as the temperature causes the resonant frequency of the system to change, the system may always remain in the resonant state. According to the photoacoustic spectrum system in this embodiment, closed-loop locking of the phase is controlled, so that, in the second harmonic modulation mode, the laser modulation frequency may be automatically locked at half of the resonant frequency of the system, and the frequency of the acoustic wave under test is always equal to the resonant frequency. The photoacoustic spectrum system always remains in the resonant state, which solves the problem that the photoacoustic spectrum system cannot cope with the change of the resonant frequency with the environmental factors, and reduces the drift coefficient of the system.

Figure 7:
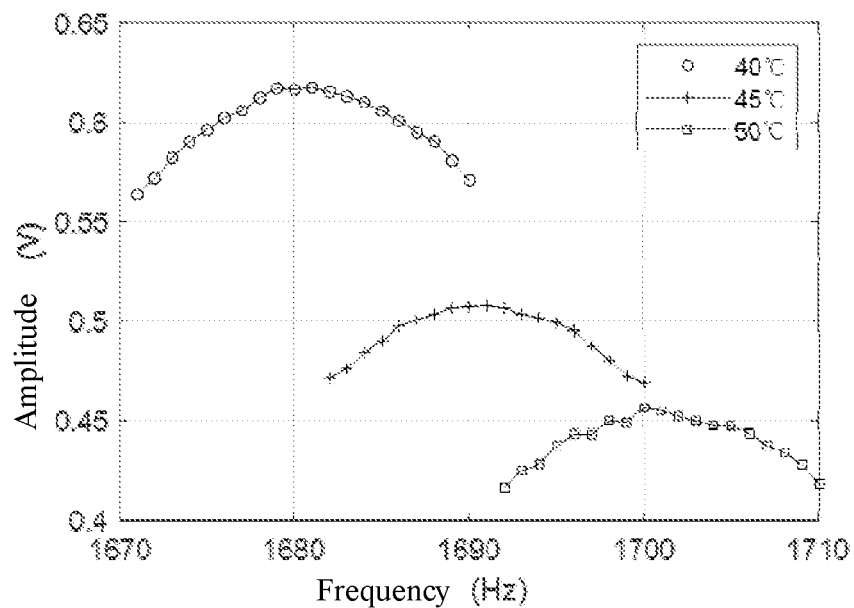
FIG. 7 is a schematic diagram of a mapping relationship between output amplitudes and laser modulation frequencies of a photoacoustic spectrum gas detection system at different temperatures according to the related art.

In the photoacoustic spectrum gas detection solution in the related art, the laser modulation frequency is generally fixed, but when affected by environmental factors, for example, when the temperature changes, the resonance frequency of the system may drift. Taking a specific photoacoustic spectrum gas detection system as an example, in the system, a cylindrical acoustic resonant cavity is used as the photoacoustic cell with a diameter of 5 mm and a length of 50 mm, a microphone with a flat frequency response is used as the acoustic sensor, the gas under test is carbon dioxide in pure nitrogen, the laser is a mid-infrared quantum cascade laser with a wavelength of 4.3 µm, and photoacoustic spectrum measurement is performed by second harmonic modulation. FIG. 7 is a schematic diagram of a mapping relationship between output amplitudes and laser modulation frequencies of a photoacoustic spectrum gas detection system at different temperatures according to the related art. As shown in FIG. 7, as the temperature changes from 40° C. to 50° C., the amplitude and the resonant frequency of the system both change. The resonance peak refers to a maximum value of the output amplitude of the system, and the resonance peak decreases, changing from 0.6168 V to 0.4566 V, and the corresponding modulation frequency increases, changing from 1680 Hz to 1700 Hz. As can be seen, as the operating temperature of the photoacoustic spectrum system changes, laser scanning at a fixed frequency may lead to a poor detection result of the system.

Figure 8:
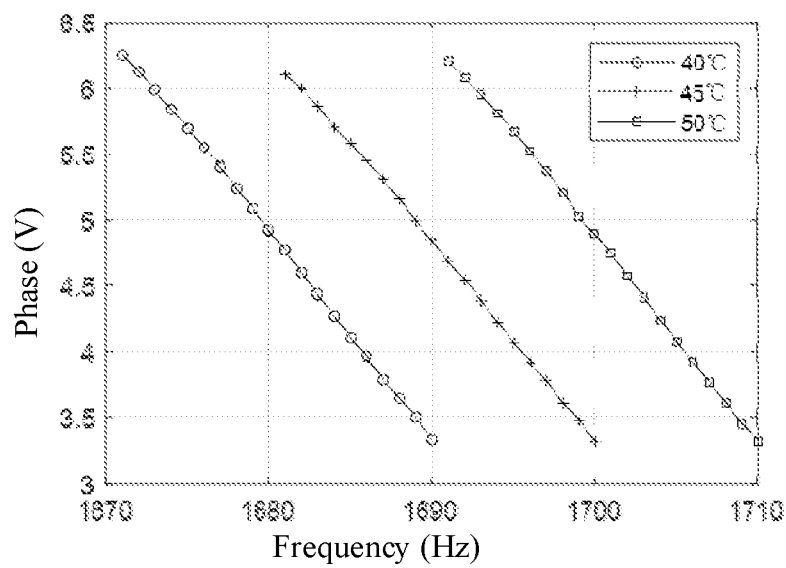
FIG. 8 is a schematic diagram of a mapping relationship between output phases and laser modulation frequencies of the photoacoustic spectrum gas detection system at different temperatures according to the related art.
Figure 9:
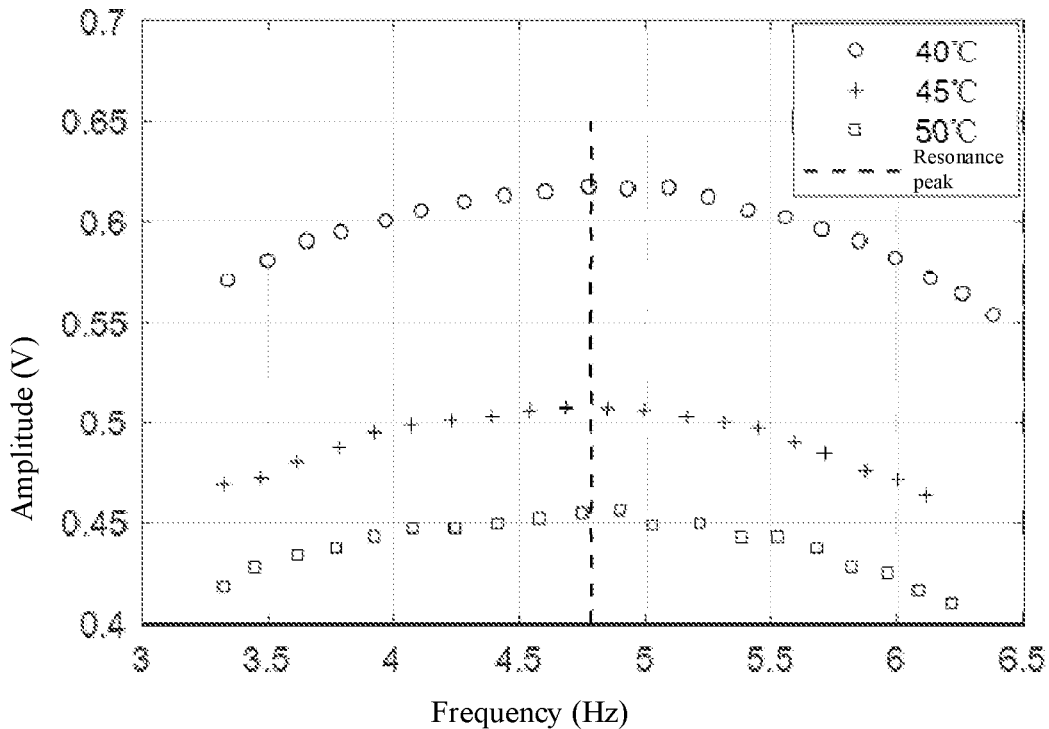
FIG. 9 is a diagram of a mapping relationship between output amplitudes and output phases of the photoacoustic spectrum system according to the related art.

FIG. 8 is a schematic diagram of a mapping relationship between output phases and laser modulation frequencies of the photoacoustic spectrum gas detection system at different temperatures according to the related art. As shown in FIG. 8, as the temperature increases, a phase-frequency curve shifts to the right. Although the laser modulation frequency corresponding to the resonance peak increases as the temperature increases, the output phase remains essentially unchanged. FIG. 9 is a diagram of a mapping relationship between output amplitudes and output phases of the photoacoustic spectrum system according to the related art. As shown in FIG. 9, in the system, when the operating temperature of the system changes, the phase corresponding to the resonance peak is at 4.78 V, and the phase remains unchanged. Therefore, when the output phase is guaranteed to be at the phase, it is guaranteed that the laser modulation frequency of the system is currently at the resonant frequency and the system is in the resonant state.

Figure 10:
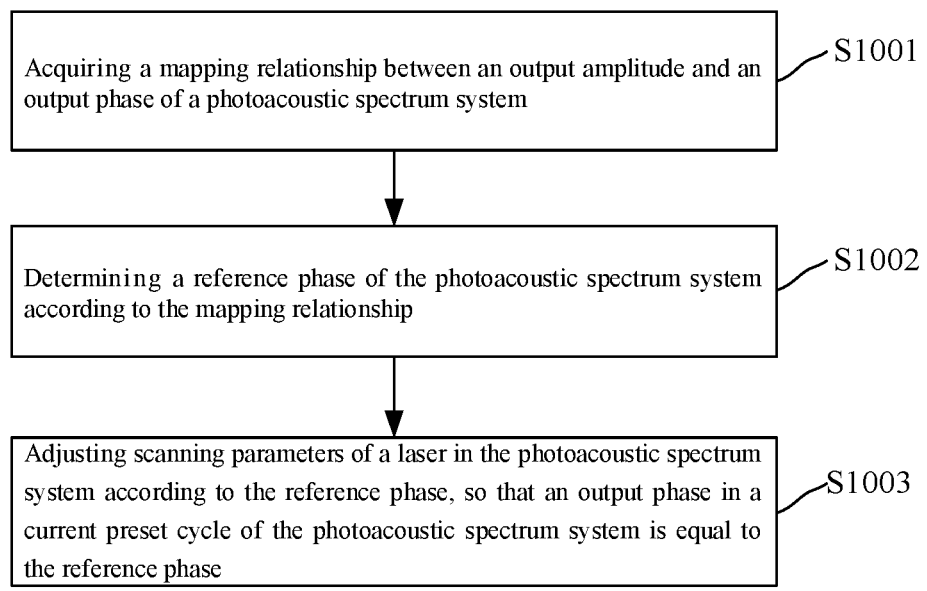
FIG. 10 is a flowchart of the photoacoustic spectrum phase locking method according to this embodiment.

This embodiment provides a photoacoustic spectrum phase locking method, applied to an improved photoacoustic spectrum system. FIG. 10 is a flowchart of the photoacoustic spectrum phase locking method according to this embodiment. As shown in FIG. 10, the process includes the following steps.

In step S1001, a mapping relationship between an output amplitude and an output phase of a photoacoustic spectrum system is acquired.

Specifically, in an initial state of the system, a frequency sweep test is performed on the photoacoustic spectrum system, and an amplitude-frequency response curve and a phase-frequency response curve of the system are obtained.

In step S1002, a reference phase of the photoacoustic spectrum system is determined according to the mapping relationship.

Specifically, a maximum value of the output amplitude of the system is the resonance peak, and the frequency thereof is the resonance frequency. A phase difference between the output of the system and an input modulation signal at the resonant frequency is taken as the reference phase $\theta_0$.

In step S1003, scanning parameters of a laser in the photoacoustic spectrum system are adjusted according to the reference phase, so that an output phase in a current preset cycle of the photoacoustic spectrum system is equal to the reference phase.

Specifically, in a resonant state of the photoacoustic spectrum gas detection system, there is a fixed difference in phase between the output of the system and the laser modulation signal, and the difference is mainly determined by processes of photo-acoustic conversion, acoustic resonance or mechanical resonance, and acoustic-electric conversion. There is a phase difference in each process. In the resonant state, the phase difference between the output of the system and the modulation signal is measured as the reference phase $\theta_0$. Then the laser modulation frequency is changed through a closed-loop to make the phase difference of the system always equal to the reference phase. Then, even if a change in the environmental factors such as the temperature causes the resonant frequency of the system to change, the system may always remain in the resonant state.

Through the above steps, according to the phase locked-loop locking method provided in the embodiments of the present disclosure, the photoacoustic spectrum system can always remain in the resonant state, which solves the problem that the system cannot cope with the change of the resonant frequency with the environmental factors, and reduces the drift coefficient of the system.

In an embodiment, the acquiring the mapping relationship between the output amplitude and the output phase of the photoacoustic spectrum system includes: acquiring a frequency sweep signal, the frequency sweep signal including a plurality of modulation signals at different frequencies; and controlling the laser to scan a detected target according to the frequency sweep signal, to obtain the output amplitude and the output phase of the photoacoustic spectrum system. Specifically, in an initial state of the photoacoustic spectrum system, a frequency of a sine wave in the laser modulation signal is changed, a frequency sweep test is performed on the photoacoustic spectrum system, and an amplitude-frequency response curve and a phase-frequency response curve of the system are obtained.

In an embodiment, the acquiring the frequency sweep signal includes: acquiring a plurality of reference signals, a frequency range corresponding to the plurality of reference signals including a resonant frequency of the photoacoustic spectrum system; and performing frequency modulation on the plurality of reference signals to obtain the frequency sweep signal. Specifically, the plurality of reference signals are acquired, and a signal frequency range of the reference signals should cover the resonant frequency of the photoacoustic spectrum system. Optionally, the signal frequency range of the reference signals ranges from 1650 Hz to 1750 Hz. In a single preset cycle, frequency modulation is performed on a reference signal at a specified frequency to obtain the frequency sweep signal, and the laser is controlled to scan the detected target according to the frequency sweep signal. An output amplitude and an output phase of the photoacoustic spectrum system in the preset cycle are determined according to the signal under test and the reference signal. The frequency of the reference signal is changed to perform the above detection process. A relation curve between amplitudes, phases, and reference signal frequencies can be obtained according to output amplitudes and output phases of a plurality of preset cycles.

In an embodiment, the determining the reference phase of the photoacoustic spectrum system according to the mapping relationship includes: determining a resonance peak according to the output amplitude; and taking the output phase corresponding to the resonant peak as the reference phase according to the mapping relationship. Specifically, according to the amplitude-frequency response curve and the phase-frequency response curve of the system obtained by performing the frequency sweep test on the photoacoustic spectrum system, the phase difference between the output signal and the modulation signal of the system at the resonant frequency is taken as the reference phase.

In an embodiment, the adjusting the scanning parameters of the laser in the photoacoustic spectrum system according to the reference phase includes: acquiring the output phase corresponding to a laser modulation signal in a previous preset cycle; adjusting the laser modulation signal in the previous preset cycle according to the output phase in the previous preset cycle, the reference phase, and a discrete PID control algorithm, to obtain a target modulation signal in the current preset cycle; and adjusting the scanning parameters of the laser in the photoacoustic spectrum system according to the target modulation signal.

Specifically, after the reference phase is set, during the operation of the photoacoustic spectrum system, with reference to the output phase of the previous cycle, an oscillation signal outputted by the second control device may be adjusted based on the output phase of the previous cycle and the reference phase.

In an embodiment, a PID controller is used as a closed-loop controller to adjust a sine wave frequency of the signal generator to stabilize the phase of the system at the reference phase. The reference phase is a phase difference between the signal under test and the reference signal preset by the system, denoted as $\theta_0$. The PID controller consists of a proportional unit P, an integral unit I, and a derivative unit D, which is generally set through three parameters Kp, Ki, and Kd. The PID controller is mainly suitable for basically linear systems whose dynamic characteristics do not change over time. The PID controller is a common feedback loop component in industrial control applications. The controller compares the collected data with a reference value, and then uses the difference between the collected data and the reference value to calculate a new input value. This new input value is intended to allow the data of the system to reach or remain at the reference value. Different from other simple control operations, the PID controller can adjust the input value according to historical data and an occurrence rate of the difference, which can make the system more accurate and stable. In this embodiment, consistency between the output phase and the reference phase can be guaranteed by presetting the reference phase and by means of a control function of the PID controller.

In an embodiment, signal modulation is performed by second harmonic modulation. The second harmonic modulation can prevent first harmonic interference caused by absorption of stray laser energy by an inner wall of the photoacoustic cell, an optical window, and the like. In this embodiment, when the photoacoustic spectrum system is in the second harmonic modulation mode, the laser modulation frequency may be automatically locked at half of the resonant frequency, so that the frequency f of the acoustic wave under test is always equal to the resonant frequency of the system $f_0$, realizing locking of the resonant frequency.

Figure 11:
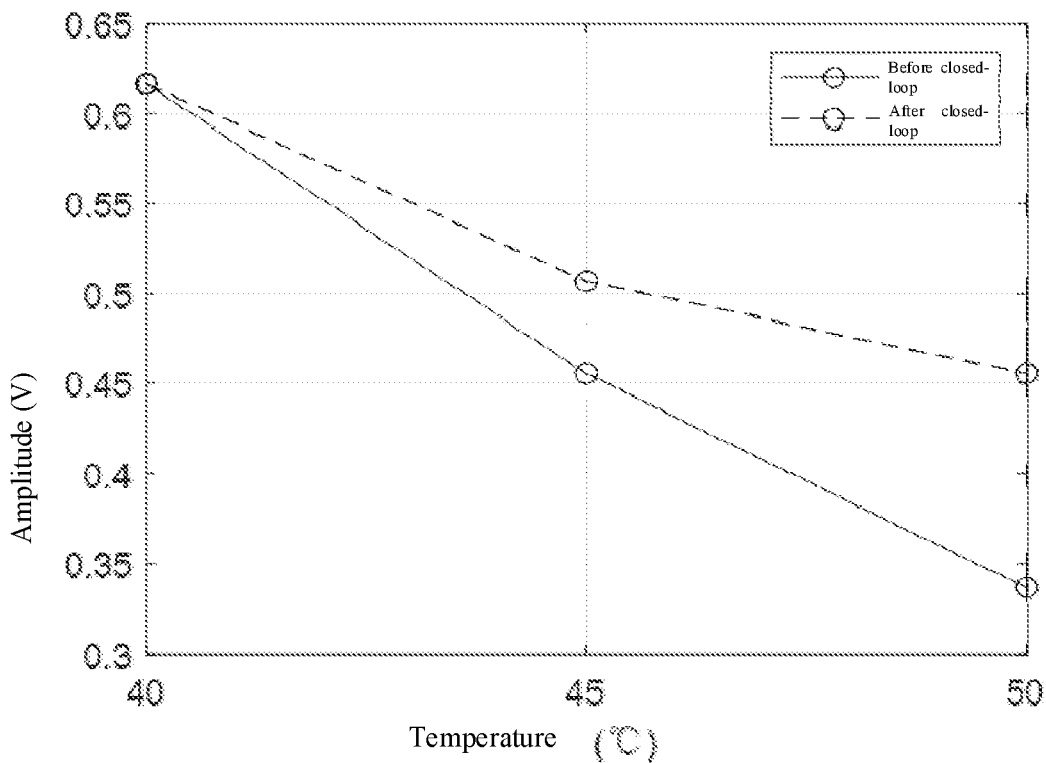
FIG. 11 is a schematic diagram of an optimization effect of a photoacoustic spectrum phase locking method according to embodiments of the present disclosure.

FIG. 11 is a schematic diagram of an optimization effect of a photoacoustic spectrum phase locking method according to embodiments of the present disclosure. Drift coefficients of the photoacoustic spectrum system before and after the phase closed-loop are shown in FIG. 11. Before the phase closed-loop, a conventional photoacoustic spectrum gas detection system is used, the laser modulation frequency is fixed at 1680 Hz, and an amplitude drift coefficient is about −0.028 V/° C. in a temperature range of 40° C. to 50° C. After the phase closed-loop, i.e., after the photoacoustic spectrum system and the photoacoustic spectrum phase locking method in the embodiments of the present disclosure are selected, the laser modulation frequency is always locked to the resonant frequency of the system, and the amplitude drift coefficient thereof is about −0.016 V/° C. Therefore, after the phase closed-loop, the amplitude drift coefficient thereof is reduced to 57% of the original. As the temperature range increases, the conventional photoacoustic spectrum system may be further away from the resonant frequency, causing the output signal of the system to be submerged in noise and unable to operate normally. By use of the phase-closed-loop photoacoustic spectrum system of the embodiments of the present disclosure in combination with the photoacoustic spectrum phase locking method of the embodiments of the present disclosure, the photoacoustic spectrum system can always be kept in the resonant state. Although the amplitude still has a certain drift, real-time compensation can be performed through modeling, which greatly expands the range of the operating temperature of the system.

This embodiment further provides a photoacoustic spectrum phase locking apparatus. The apparatus is configured to implement the above embodiments and optional implementations, and those that have already been described are not described in detail again. The terms "module", "unit", "subunit", and the like used hereinafter may be a combination of software and/or hardware realizing predetermined functions. Although the apparatus described in the following embodiments are preferably implemented in software, implementations in hardware, or a combination of software and hardware are also possible and contemplated.

Figure 12:
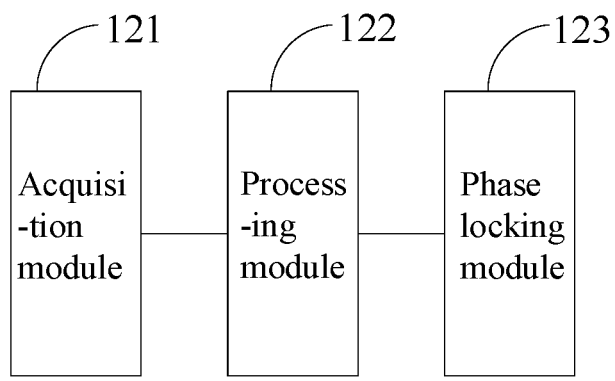
FIG. 12 is a structural block diagram of a photoacoustic spectrum phase locking apparatus according to this embodiment.

FIG. 12 is a structural block diagram of a photoacoustic spectrum phase locking apparatus according to this embodiment. As shown in FIG. 12, the apparatus includes:

- an acquisition module 121 configured to acquire a mapping relationship between an output amplitude and an output phase of a photoacoustic spectrum system;
- a processing module 122 configured to determine a reference phase of the photoacoustic spectrum system according to the mapping relationship; and
- a phase locking module 123 configured to adjust scanning parameters of a laser in the photoacoustic spectrum system according to the reference phase, so that an output phase in a current preset cycle of the photoacoustic spectrum system is equal to the reference phase.

The acquisition module 121 is further configured to acquire a frequency sweep signal, the frequency sweep signal including a plurality of modulation signals at different frequencies; and control the laser to scan a detected target according to the frequency sweep signal, to obtain the output amplitude and the output phase of the photoacoustic spectrum system.

The acquisition module 121 is further configured to acquire a plurality of reference signals, a frequency range corresponding to the plurality of reference signals including a resonant frequency of the photoacoustic spectrum system; and perform frequency modulation on the plurality of reference signals to obtain the frequency sweep signal.

The processing module 122 is further configured to acquire determining a resonance peak according to the output amplitude; and take the output phase corresponding to the resonant peak as the reference phase according to the mapping relationship.

The phase locking module 123 is further configured to acquire the output phase corresponding to a laser modulation signal in a previous preset cycle, adjust the laser modulation signal in the previous preset cycle according to the output phase in the previous preset cycle, the reference phase, and a discrete PID control algorithm, to obtain a target modulation signal in the current preset cycle; and adjust the scanning parameters of the laser in the photoacoustic spectrum system according to the target modulation signal.

This embodiment further provides an electronic apparatus, including a memory and a processor. The memory stores a computer program. The processor is configured to execute the computer program to perform the steps in any one of the above method embodiments.

Optionally, the above electronic apparatus may further include a transmission device and an input/output device. The transmission device is connected to the above processor, and the input/output device is connected to the above processor.

Optionally, in this embodiment, the above processor may be configured to perform the following steps through the computer program.

In S1, a mapping relationship between an output amplitude and an output phase of a photoacoustic spectrum system is acquired.

In S12, a reference phase of the photoacoustic spectrum system is determined according to the mapping relationship.

In S3, scanning parameters of a laser in the photoacoustic spectrum system are adjusted according to the reference phase, so that an output phase in a current preset cycle of the photoacoustic spectrum system is equal to the reference phase.

It is to be noted that, for specific examples in this embodiment, reference may be made to the examples described in the above embodiments and optional implementations, and details are not described again in this embodiment.

In addition, in combination with the photoacoustic spectrum phase locking method provided in the above embodiments, a storage medium may also be provided in this embodiment for implementation. The storage medium stores a computer program. When the computer program is executed by a processor, the photoacoustic spectrum phase locking method in any one of the above embodiments is implemented.

It should be understood that specific embodiments described herein are merely used to explain the present disclosure but are not intended to limit the present disclosure. All other embodiments obtained by those of ordinary skill in the art based on the embodiments provided in the present disclosure without creative efforts shall fall within the protection scope of the present disclosure.

Obviously, the accompanying drawings described below are only some examples or embodiments of the present disclosure. Those of ordinary skill in the art may apply the present disclosure to other similar scenarios according to these accompanying drawings without creative efforts. In addition, it should be further understood that, although efforts made in this development process may be complicated and tedious, for those of ordinary skill in the art related to the content disclosed in the present disclosure, some designs, manufacturing or production changes based on the technical content disclosed in the present disclosure are merely conventional technical means, and should not be understood as insufficient content disclosed in the present disclosure.

The "embodiments" as referred to in the present disclosure means that particular features, structures or characteristics described with reference to the embodiments may be included in at least one embodiment of the present disclosure. Phrases appearing at various positions of the specification neither always refer to the same embodiment, nor separate or alternative embodiments that are mutually exclusive with other embodiments. It is explicitly and implicitly understood by those of ordinary skill in the art that the embodiments described in the present disclosure may be combined with other embodiments without any conflict.

The above embodiments only describe several implementations of the present disclosure, and their description is specific and detailed, but cannot therefore be understood as a limitation on the patent protection scope. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A photoacoustic spectrum phase locking method, comprising:
    acquiring a mapping relationship between an output amplitude and an output phase of a photoacoustic spectrum system;
    determining a reference phase of the photoacoustic spectrum system according to the mapping relationship; and
    adjusting scanning parameters of a laser in the photoacoustic spectrum system according to the reference phase, so that an output phase in a current preset cycle of the photoacoustic spectrum system is equal to the reference phase,
    wherein the adjusting the scanning parameters of the laser in the photoacoustic spectrum system according to the reference phase comprises:
    acquiring the output phase corresponding to a laser modulation signal in a previous preset cycle;
    adjusting the laser modulation signal in the previous preset cycle according to the output phase in the previous preset cycle, the reference phase, and a discrete proportional-integral-derivative (PID) control algorithm, to obtain a target modulation signal in the current preset cycle; and
    adjusting the scanning parameters of the laser in the photoacoustic spectrum system according to the target modulation signal.

2. The photoacoustic spectrum phase locking method of claim 1, wherein the acquiring the mapping relationship between the output amplitude and the output phase of the photoacoustic spectrum system comprises:
    acquiring a frequency sweep signal, wherein the frequency sweep signal comprises a plurality of modulation signals at different frequencies; and
    controlling the laser to scan a detected target according to the frequency sweep signal, to obtain the output amplitude and the output phase of the photoacoustic spectrum system.

3. The photoacoustic spectrum phase locking method of claim 2, wherein the acquiring the frequency sweep signal comprises:
    acquiring a plurality of reference signals, wherein a frequency range corresponding to the plurality of reference signals comprises a resonant frequency of the photoacoustic spectrum system; and
    performing frequency modulation on the plurality of reference signals to obtain the frequency sweep signal.

4. The photoacoustic spectrum phase locking method of claim 1, wherein the determining the reference phase of the photoacoustic spectrum system according to the mapping relationship comprises:
    determining a resonance peak according to the output amplitude; and
    taking the output phase corresponding to the resonance peak as the reference phase according to the mapping relationship.

5. A photoacoustic spectrum system, comprising: a first control device, a detection device, and a second control device; wherein the first control device is connected to the detection device and the second control device;
    the first control device is configured to configure scanning parameters of the detection device;
    the detection device is configured to emit laser light on a detected target according to the scanning parameters to generate a signal under test; and
    the second control device is configured to perform the photoacoustic spectrum phase locking method of claim 1.

6. The photoacoustic spectrum system of claim 5, wherein the detection device comprises a laser, a photoacoustic cell, and an acoustic sensor, the laser is connected to the first control device and the photoacoustic cell respectively, the photoacoustic cell is connected to the acoustic sensor, and the acoustic sensor is connected to the second control device;
    the laser is configured to emit laser light to the photoacoustic cell according to the scanning parameters;
    the photoacoustic cell is configured to accommodate a gas under test, so that the gas under test generates an acoustic wave signal under laser irradiation; and
    the acoustic sensor is configured to receive and enhance the acoustic wave signal, generate an electrical signal or a digital signal from the enhanced acoustic wave signal, and send the electrical signal or the digital signal to the second control device.

7. The photoacoustic spectrum system of claim 6, wherein the photoacoustic cell and/or the acoustic sensor are/is in a resonant state.

8. The photoacoustic spectrum system of claim 6, wherein the first control device comprises a signal generator and a laser controller, and the second control device comprises a lock-in amplifier and a closed-loop controller, the signal generator is connected to the closed-loop controller and the laser controller respectively, and the laser controller is connected to the laser; and the lock-in amplifier is connected to the acoustic sensor and the closed-loop controller respectively;
    the signal generator is configured to generate a modulation signal and send the modulation signal to the laser controller;
    the laser controller is configured to configure scanning parameters for the laser according to the modulation signal;
    the lock-in amplifier is configured to generate an output amplitude and an output phase according to a reference signal and the signal under test; and
    the closed-loop controller is configured to determine a reference phase according to the output amplitude and the output phase, generate a main control signal according to the reference phase, and send the main control signal to the signal generator, so that the signal generator adjusts the scanning parameters of the laser in the photoacoustic spectrum system according to the main control signal, enabling an output phase in a current preset cycle of the photoacoustic spectrum system to be equal to the reference phase.

9. The photoacoustic spectrum system of claim 5, wherein the acquiring the mapping relationship between the output amplitude and the output phase of the photoacoustic spectrum system comprises:
    acquiring a frequency sweep signal, wherein the frequency sweep signal comprises a plurality of modulation signals at different frequencies; and
    controlling the laser to scan a detected target according to the frequency sweep signal, to obtain the output amplitude and the output phase of the photoacoustic spectrum system.

10. The photoacoustic spectrum system of claim 9, wherein the acquiring the frequency sweep signal comprises:
    acquiring a plurality of reference signals, wherein a frequency range corresponding to the plurality of reference signals comprises a resonant frequency of the photoacoustic spectrum system; and performing frequency modulation on the plurality of reference signals to obtain the frequency sweep signal.

11. The photoacoustic spectrum system of claim 5, wherein the determining the reference phase of the photoacoustic spectrum system according to the mapping relationship comprises:

determining a resonance peak according to the output amplitude; and taking the output phase corresponding to the resonance peak as the reference phase according to the mapping relationship.

12. A photoacoustic spectrum phase locking apparatus, comprising:

an acquisition module configured to acquire a mapping relationship between an output amplitude and an output phase of a photoacoustic spectrum system;

a processing module configured to determine a reference phase of the photoacoustic spectrum system according to the mapping relationship; and a phase locking module configured to adjust scanning parameters of a laser in the photoacoustic spectrum system according to the reference phase, so that an output phase in a current preset cycle of the photoacoustic spectrum system is equal to the reference phase, wherein the phase locking module is further configured for acquiring the output phase corresponding to a laser modulation signal in a previous preset cycle; adjusting the laser modulation signal in the previous preset cycle according to the output phase in the previous preset cycle, the reference phase, and a discrete proportional-integral-derivative (PID) control algorithm, to obtain a target modulation signal in the current preset cycle; and adjusting the scanning parameters of the laser in the photoacoustic spectrum system according to the target modulation signal.

* * * * *